(12) United States Patent
Abbatiello et al.

(10) Patent No.: US 12,508,794 B2
(45) Date of Patent: Dec. 30, 2025

(54) COMPOSITE CARBON FIBER LAMINATE FOR AN INFORMATION HANDLING SYSTEM

(71) Applicant: Dell Products L.P., Round Rock, TX (US)

(72) Inventors: Nicholas Abbatiello, Round Rock, TX (US); Xin Hua Tian, Shanghai (CN); Xiu Feng Qiao, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 166 days.

(21) Appl. No.: 17/385,202

(22) Filed: Jul. 26, 2021

(65) Prior Publication Data

US 2023/0026902 A1    Jan. 26, 2023

(51) Int. Cl.
*B32B 5/26*        (2006.01)

(52) U.S. Cl.
CPC .............. *B32B 5/262* (2021.05); *B32B 5/277* (2021.05); *B32B 2250/05* (2013.01); *B32B 2250/20* (2013.01); *B32B 2250/40* (2013.01); *B32B 2262/101* (2013.01); *B32B 2262/106* (2013.01); *B32B 2307/416* (2013.01); *B32B 2457/00* (2013.01)

(58) Field of Classification Search
CPC ..... B32B 5/262; B32B 5/277; B32B 2250/05; B32B 2250/20; B32B 2250/40; B32B 2262/101; B32B 2262/106; B32B 2307/416; B32B 2457/00

USPC ......................................... 442/229–233, 247
See application file for complete search history.

(56) References Cited

U.S. PATENT DOCUMENTS

| | | | |
|---|---|---|---|
| 2018/0099479 A1* | 4/2018 | Abbatiello | .............. B32B 5/024 |
| 2019/0248107 A1* | 8/2019 | Hatanaka | .................. B32B 5/28 |
| 2021/0282483 A1* | 9/2021 | Lanternari | ........... A41D 31/325 |

FOREIGN PATENT DOCUMENTS

| | | | | |
|---|---|---|---|---|
| CN | 111002646 A | * | 4/2020 | |
| EP | 3845377 A1 | * | 7/2021 | ....... B29C 45/14786 |

* cited by examiner

*Primary Examiner* — Matthew D Matzek
(74) *Attorney, Agent, or Firm* — McDermott Will & Schulte LLP

(57) ABSTRACT

A composite carbon fiber laminate, including a first carbon fiber woven fabric layer, including one or more first voids defined between fabric strands of the first carbon fiber woven fabric layer; a second carbon fiber woven fabric layer, including one or more second voids defined between fabric strands of the second carbon fiber woven fabric layer; a core fabric layer; a first reflective layer positioned between the first carbon fiber woven fabric layer and the core fabric layer; and a second reflective fabric layer positioned between the second carbon fiber woven fabric layer and the core fabric layer, wherein the first reflective layer reflects light that is incident upon the first carbon fiber woven fabric layer at the one or more first voids.

4 Claims, 7 Drawing Sheets

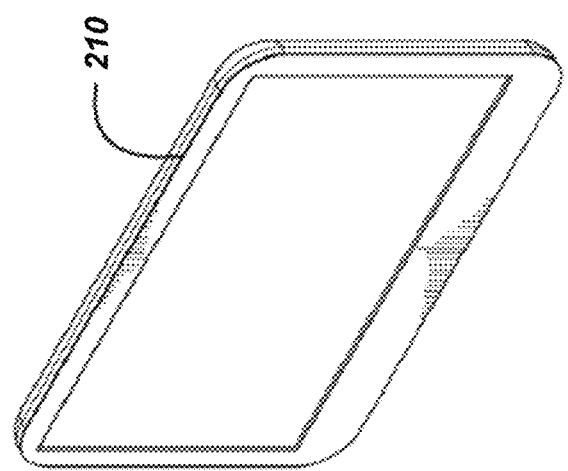
FIG. 5

COMPOSITE CARBON FIBER LAMINATE FOR AN INFORMATION HANDLING SYSTEM

BACKGROUND

Field of the Disclosure

The disclosure relates generally to an information handling system, and in particular, a composite carbon fiber laminate for an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a composite carbon fiber laminate, including a first carbon fiber woven fabric layer, including one or more first voids defined between fabric strands of the first carbon fiber woven fabric layer; a second carbon fiber woven fabric layer, including one or more second voids defined between fabric strands of the second carbon fiber woven fabric layer; a core fabric layer; a first reflective layer positioned between the first carbon fiber woven fabric layer and the core fabric layer; and a second reflective fabric layer positioned between the second carbon fiber woven fabric layer and the core fabric layer, wherein the first reflective layer reflects light that is incident upon the first carbon fiber woven fabric layer at the one or more first voids.

Other embodiments of these aspects include corresponding systems and apparatus.

These and other embodiments may each optionally include one or more of the following features. For instance, the second reflective layer reflects light that is incident upon the second carbon fiber woven fabric layer at the one or more second voids. The first and the second reflective layers are metalized glass fiber fabric. The first and the second reflective layers are dyed glass fiber fabric. The first and the second reflective layers are metalized carbon fiber fabric. The first and the second reflective layers are dyed carbon fiber fabric. The first and the second reflective layer are metalized non-woven mat. Further comprising an additional fabric layer positioned between the first carbon fiber woven fabric layer and the first reflective layer, the additional fabric layer having a fabric areal weight (FAW) of less than 75 grams per square meter (GSM).

Particular implementations of the subject matter described in this specification can be implemented so as to realize one or more of the following advantages. For example, a cosmetic appearance of a fiber material covering of a casing/housing of an information handling system is improved.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

FIGS. 5 and 6 illustrate examples of the information handling system, according to one or more embodiments.

DESCRIPTION OF PARTICULAR EMBODIMENT(S)

Figure 1:
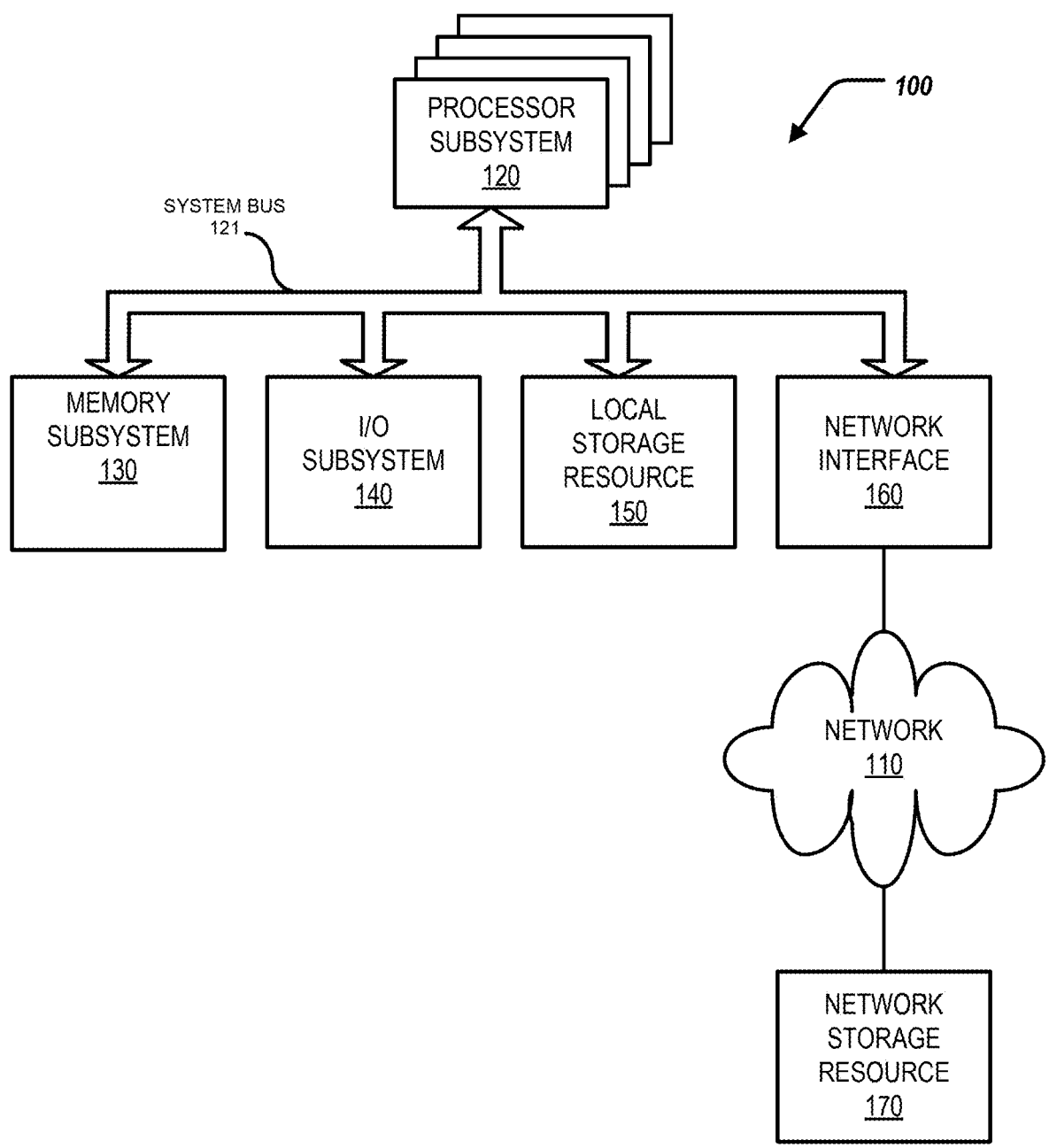
FIG. 1 is a block diagram of selected elements of an embodiment of an information handling system.

This disclosure discusses a composite carbon fiber laminate of an information handling system. In short, the information handling system can include a physical casing (or physical housing). A (cosmetic) fabric layer stack can be coupled to the physical casing (e.g., plastic or metal physical casing) or coupled "on the top of" the physical casing. The fabric layer stack can include particular fabric layers and a particular stacking arrangement of the fabric layers to improve a cosmetic performance of the fabric layer stack and the physical casing of the information handling system.

Specifically, this disclosure discusses a composite carbon fiber laminate, including: a first carbon fiber woven fabric layer, including one or more first voids defined between fabric strands of the first carbon fiber woven fabric layer; a second carbon fiber woven fabric layer, including one or more second voids defined between fabric strands of the second carbon fiber woven fabric layer; a core fabric layer; a first reflective layer positioned between the first carbon fiber woven fabric layer and the core fabric layer; a second reflective fabric layer positioned between the second carbon fiber woven fabric layer and the core fabric layer; wherein the first reflective layer reflects light that is incident upon the first carbon fiber woven fabric layer at the one or more first voids.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-7 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

In short, the information handling system 100 can include a physical casing (or physical housing). A (cosmetic) fabric layer stack can be coupled to the physical casing (e.g., plastic or metal physical casing) or coupled "on the top of" the physical casing. The fabric layer stack can include particular fabric layers and a particular stacking arrangement of the fabric layers to improve a cosmetic performance of the fabric layer stack and the physical casing of the information handling system.

Figure 2:
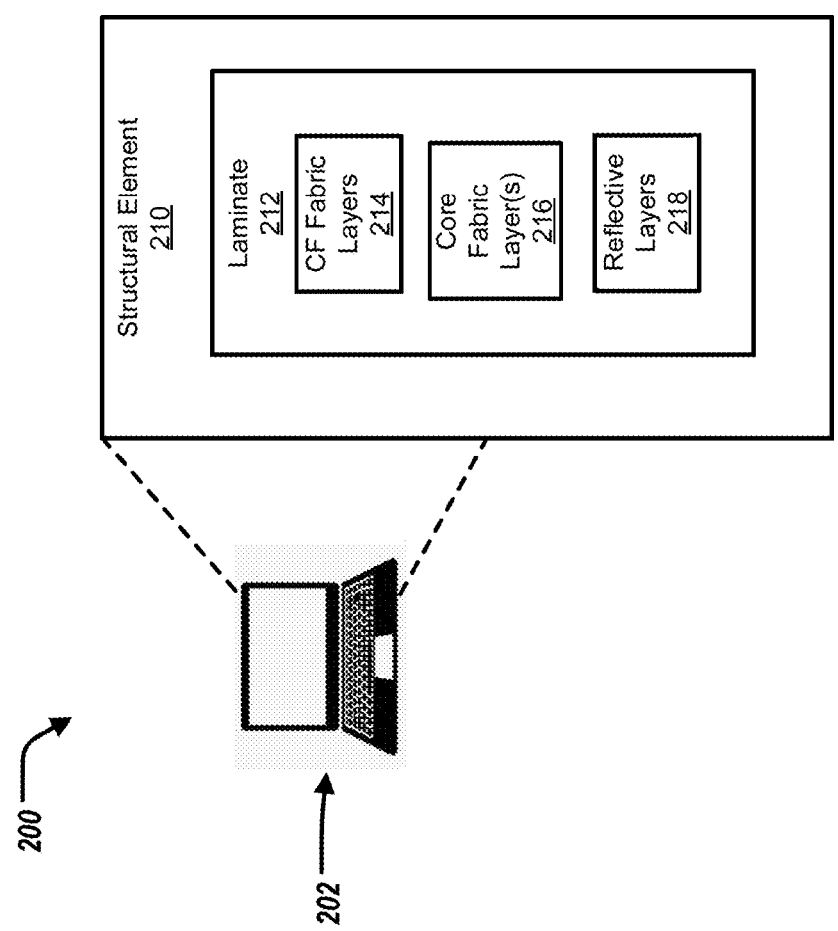
FIG. 2 illustrates a block diagram of the information handling system including a composite carbon fiber laminate.

Turning to FIG. 2, FIG. 2 illustrates an environment 200 including an information handling system 202. The information handling system 202 can include structural elements 210, such as a physical casing (or physical housing) of the information handling system 202. For example, the structural elements 210 can include plastic, metal, or similar. In some examples, the information handling system 202 is similar to, or includes, the information handling system 100 of FIG. 1.

A composite carbon fiber (CF) laminate 212 can be coupled to the structural elements 210. For example, the CF laminate 212 can be positioned on an exterior of the structural elements 210 (positioned on "top" of the structural elements 210). The composite CF laminate 212 can include multiple layers, including CF fabric woven layers 214, core fabric layer(s) 216, and reflective layers 218.

Figure 3:
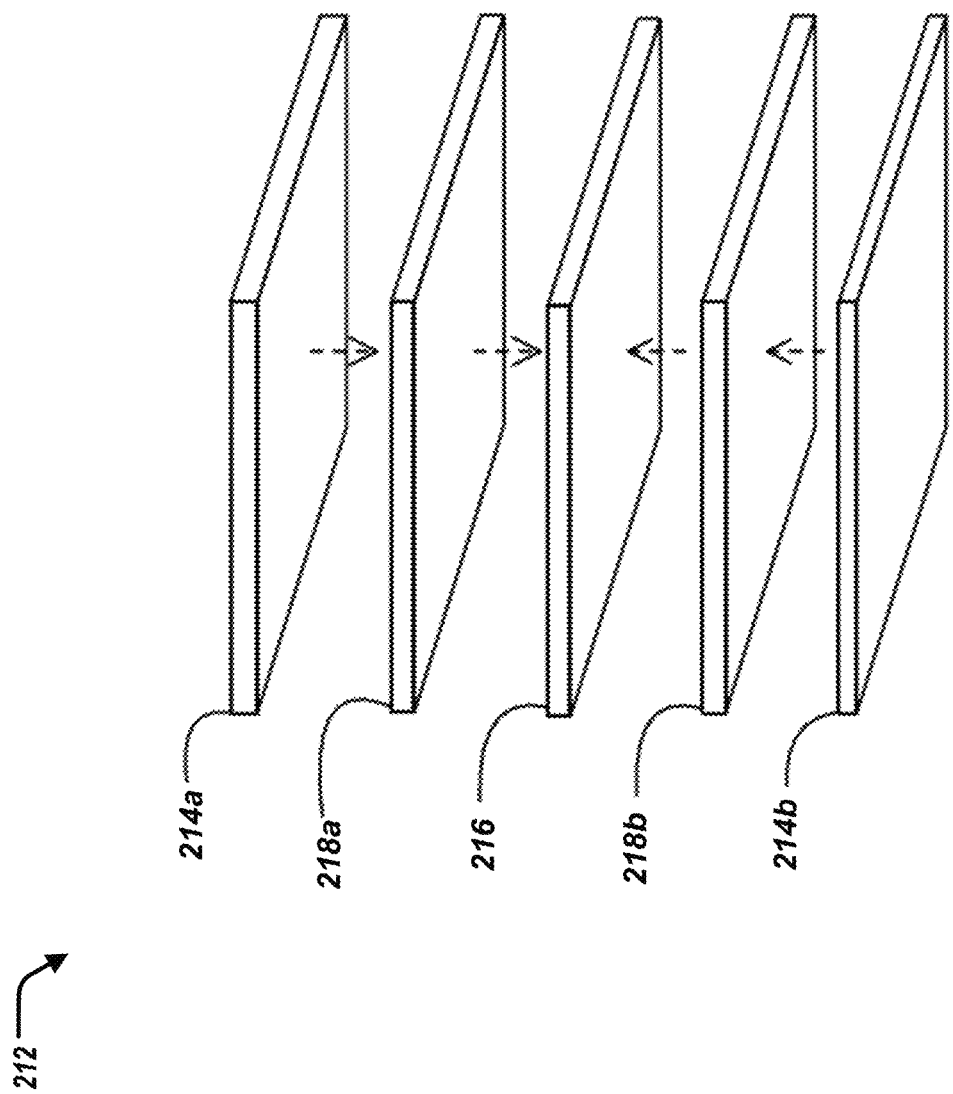
FIG. 3 illustrates an exploded view of the composite carbon fiber laminate.

FIG. 3 illustrates an exploded view of the composite carbon fiber (CF) laminate 212. A first reflective layer 218a (of the reflective layer 218) can be positioned between a first CF fabric layer 214a (of the CF fabric woven layers 214) and the core layer 216; and a second reflective layer 218b (of the reflective layer 218) can be positioned between a first CF fabric layer 214b (of the CF fabric woven layers 214) and the core layer 216. The core layer 216 can be positioned between the first reflective layer 218a and the second reflective layer 218b.

Figure 4:
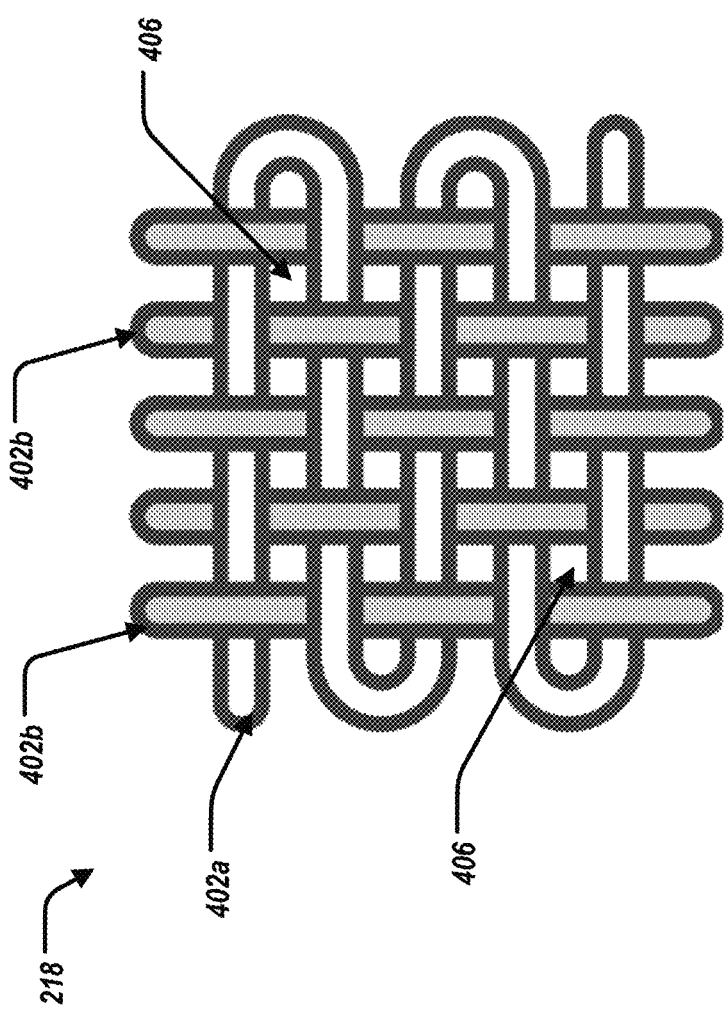
FIG. 4 illustrates a close up view of carbon fiber woven fabric layers of the composite carbon fiber laminate.

FIG. 4 illustrates a close up view of the CF woven fabric layer 214 (i.e., one of the CF fabric woven layers 214a, 214b) of the composite CF laminate 212. The CF woven fabric layer 214 can include fabric strands 402a and 402b (collectively referred to as fabric strands 402). In some examples, the fabric strand(s) 402a can be considered warp fabric strands—fabric strands that are held "stationary" in tension when the CF woven fabric layer 214 is formed; and the fabric strand(s) 402b can be considered weft fabric strands—fabric strands that traverse the warp fabric strands (e.g., over-and-under) when the CF woven fabric layer 214 is formed. To that end, voids 406 can be defined between intersections of the strands 402, e.g., between the strands 402a and 402b.

Referring back to FIG. 3, the CF woven fabric layers 214 can include a polycarbonate material and/or a post-consumer recycle material. In some examples, the CF woven fabric layers 214 include approximately 3000 fibers (tow). In some examples, the CF woven fabric layers 214 further include a resin (clear).

In some examples, the core fabric layer 216 can include 2-3 layers. In some examples, the core fabric layer 216 includes a flat tow (12k) woven fabric. In some examples, the core fabric layer 216 is a glass fiber woven fabric. In some examples, the core fabric layer 216 is a non-woven mat comprised of recycled carbon fibers. In some examples, the core fabric layer 216 further includes a resin (clear). In some examples, the core fabric layer 216 includes a polycarbonate material and/or a post-consumer recycle material.

In some examples, the reflective layers 218 (the first reflective layer 218a and the second reflective layer 218b) can include metalized glass fiber fabric. In some examples, the reflective layers 218 can include dyed glass fiber fabric. In some examples, the reflective layers 218 are metalized carbon fiber fabric. In some examples, the reflective layers 218 are dyed carbon fiber fabric. In some examples, the reflective layers 218 are metalized non-woven mat. In some examples, the reflective layers 218 are in combination/composition of metalized glass fiber fabric, dyed glass fiber fabric, metalized carbon fiber fabric, dyed carbon fiber fabric, and/or metalized non-woven mat. In some examples, the reflective layers 218 are dyed low fabric areal weight (FAW) of less than 75 grams per square meter (GSM) glass fiber fabric. In some examples, the reflective layers 218 are metalized low fabric areal weight (FAW) of less than 75 grams per square meter (GSM) glass fiber fabric. In some examples, the reflective layers 218 further includes a resin (clear). In some examples, the reflective layers 218 include a polycarbonate material and/or a post-consumer recycle material.

In some implementations, the first reflective layer 218a reflects light that is incident upon the first CF woven fabric layer 214a at the voids 406. That is, light can be incident upon the structural element 210, and in particular, the composite CF laminate 212. For example, the light can include natural or artificial light. The light that is incident upon the composite CF laminate 212 can be incident upon the voids 406 of the first woven fabric layer 214a. To that end, the first reflective layer 218a, that is positioned between the first woven fabric layer 214a and the core layer 216, can reflect such light that is incident upon the voids 406 of the first woven fabric layer 214a. As a result, a "dirty" cosmetic appearance of the composite CF laminate 212 and the structural element 210 is mitigated. That is, the "dirty" cosmetic appearance of the voids 406 is mitigated by the first reflective layer 218a reflecting light that is incident upon the voids 406 of the first woven fabric layer 214a. In some cases, the first reflective layer 218a, when light is incident upon the voids 406 of the first woven fabric layer 214a, can enhance any color appearance of the first woven fabric layer 214a (improving a vibrancy of the color of the first woven fabric layer 214a) by reflecting such light that is incident upon the composite CF laminate 212. In other words, the first reflective layer 218a, when light is incident upon the voids 406 of the first woven fabric layer 214a, can improve the cosmetic appearance of the first woven fabric layer 214a and maintain any predetermined color performance targets.

Similarly, in some implementations, the second reflective layer 218b reflects light that is incident upon the second CF woven fabric layer 214b at the voids 406. That is, light can be incident upon the structural element 210, and in particular, the composite CF laminate 212. For example, the light can include natural or artificial light. The light that is incident upon the composite CF laminate 212 can be incident upon the voids 406 of the second woven fabric layer 214b. To that end, the second reflective layer 218b, that is positioned between the second woven fabric layer 214b and the core layer 216, can reflect such light that is incident upon the voids 406 of the second woven fabric layer 214b. As a result, a "dirty" cosmetic appearance of the composite CF laminate 212 and the structural element 210 is mitigated. That is, the "dirty" cosmetic appearance of the voids 406 is mitigated by the second reflective layer 218b reflecting light that is incident upon the voids 406 of the second woven fabric layer 214b. In some cases, the second reflective layer 218b, when light is incident upon the voids 406 of the second woven fabric layer 214b, can enhance any color appearance of the second woven fabric layer 214b (improving a vibrancy of the color of the second woven fabric layer 214b) by reflecting such light that is incident upon the composite CF laminate 212. In other words, the second reflective layer 218b, when light is incident upon the voids 406 of the second woven fabric layer 214b, can improve the cosmetic appearance of the second woven fabric layer 214b and maintain any predetermined color performance targets.

In some examples, the composite CF laminate 212 can include an additional fabric layer (not shown) positioned between the first CF woven fabric layer 214a and the first reflective layer 218a; and/or positioned between the second CF woven fabric layer 214b and the second reflective layer 218b. The additional fabric layer can have a FAW of less than 75 GSM.

Figure 6:
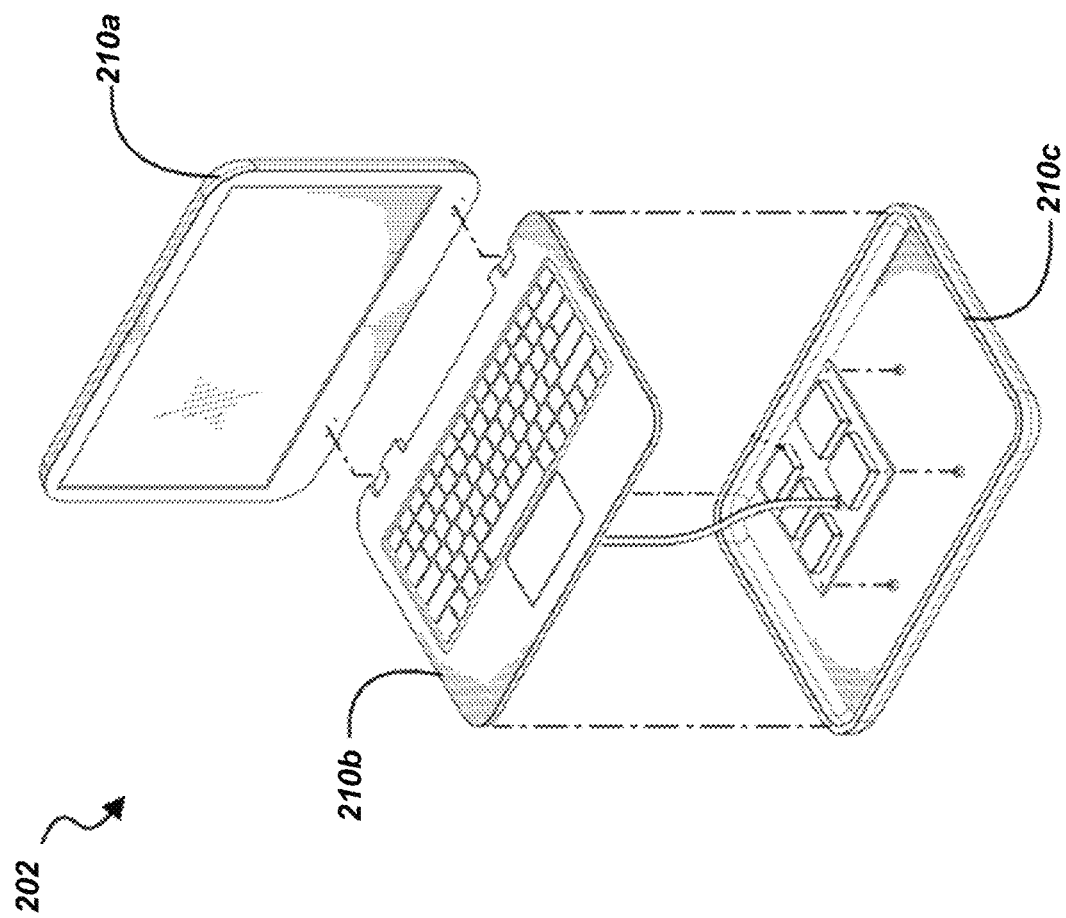

Turning now to FIGS. 5 and 6, examples of the information handling systems 202 are illustrated, according to one or more embodiments. As shown in FIG. 5, the information handling system 202 may include the structural element 210. For example, the information handling system 202 can include a portable computing device, such as a mobile device, a telephony device, a smart phone, a tablet computing device, a consumer electronic device, an electronic music player, an electronic camera, an electronic video player, a wireless access point, a network storage device, and a non-volatile memory medium, among others. The structural element 210 can include a physical casing or physical housing of the portable computing device. The composite CF laminate 212 can be positioned on (or coupled to) the structural element 210.

As shown in FIG. 6, the information handling system 202 may include the structural elements 210a, 210b, 210c. For example, the information handling system 202 can include a mobile device, a laptop computing device, a consumer electronic device, an electronic music player, and an electronic video player, among others. The structural elements 210a, 210b, 210c can include a physical casing or physical housing of the information handling system 202. The composite CF laminate 212 can be positioned on (or coupled to) the structural elements 210a, 210b, and/or 210c.

Figure 7:
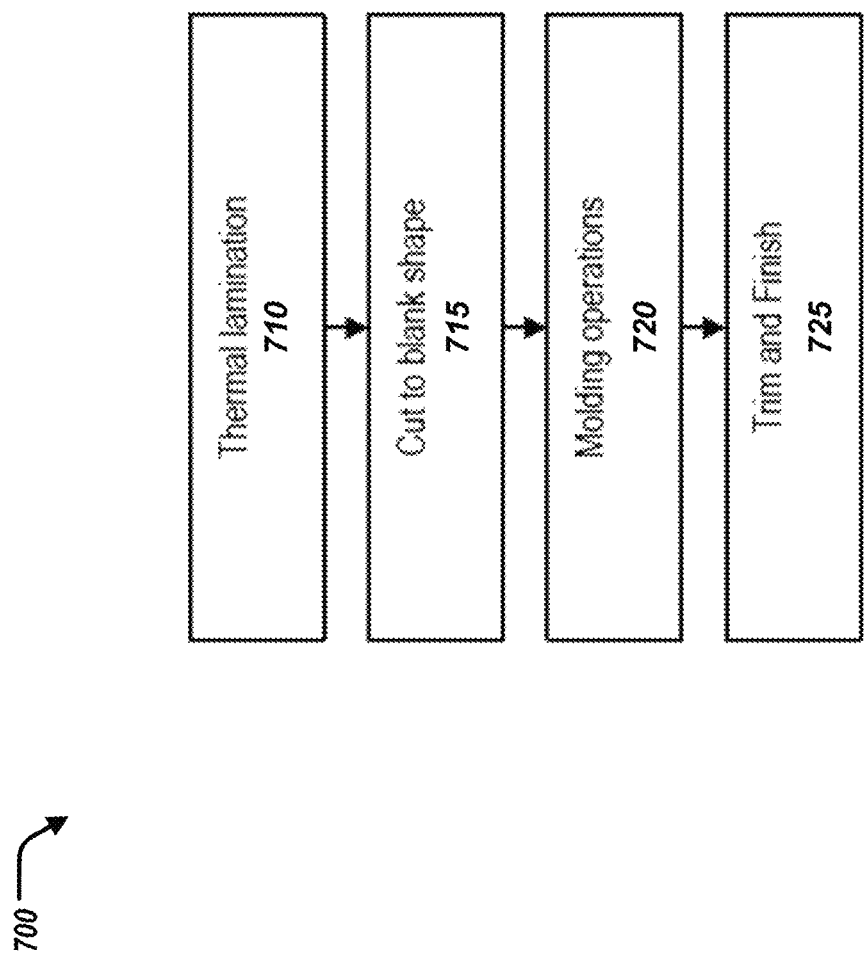
FIG. 7 illustrates an example of a method, according to one or more embodiments.

Turning now to FIG. 7, an example of a method 700 is illustrated, according to one or more embodiments. At step 720, thermal lamination may be performed on multiple layers used to manufacture a part. For example, the CF fabric woven layers 214, the core fabric layer(s) 216, and/or the reflective layers 218 can be thermally bonded together. In one or more embodiments, method element 710 may be performed using a rolling mill to manufacture a roll of thermoplastic carbon fiber laminate with a randomly oriented fiber reinforced core layer from individual rolls of the constituent materials. In one or more embodiments, method element 710 may be performed using individual discrete sheets to manufacture a sheet of non-woven thermoplastic carbon fiber laminate. In one or more embodiments, the thermal lamination of method element 710 may apply suitable temperatures and pressures, according to the particular material compositions used, such as for the thermoplastic matrix used in each individual layer. In one or more embodiments, method element 710 may produce the composite CF laminate 212.

At 715, a blank may be cut to shape from the thermally laminated material. For example, a blank may be cut to shape from the thermally laminated material produced via method element 710. In one or more embodiments, the blank may be stamped or machined to shape. For example, the blank may be stamped or machined to shape, depending on the intricacy or specific features on a particular part being manufactured.

At 720 and 725, the blank manufactured at 715 may be subject to molding operations and trim and finish, respectively. It is noted that the exact method elements included in method elements 720 and 725 may vary depending on the type of mold operation used, according to one or more embodiments. In a first example, at 720, a first thermoforming molding operation may be performed to initially shape the blank. In the first example, after trimming at 720, a second insert molding operation may be performed to add a secondary polymer layer to the blank. The secondary polymer layer may include an aesthetic or design element, such as for an external surface of the final part that is exposed to human handling by end users, according to one or more embodiments. Then in the second example, at 725, the final surface treatment of the finished part may be performs, such as painting or application of surface films, according to one or more embodiments. In a second example, at 720, a hybrid molding operation may be performed in which the blank is shaped using thermoforming molding, and then the secondary polymer layer is injection molded into the same mold. In the second example, at 725, the hybrid molded part may be trimmed and surface finished, as described in the first example. In a third example, at 720 and 725, hybrid molding may be performed to create the final part, including the application of any surface finishing within the mold.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A composite carbon fiber laminate, comprising:
   a first carbon fiber woven fabric layer, including one or more first voids defined between fabric strands of the first carbon fiber woven fabric layer;
   a second carbon fiber woven fabric layer, including one or more second voids defined between fabric strands of the second carbon fiber woven fabric layer;
   a core woven fabric layer;
   a first dyed reflective layer positioned between the first carbon fiber woven fabric layer and the core woven fabric layer;
   a second dyed reflective fabric layer positioned between the second carbon fiber woven fabric layer and the core woven fabric layer, and
   a first additional fabric layer positioned between the first carbon fiber woven fabric layer and the first dyed reflective layer, the first additional fabric layer having a first fabric area weight (FAW),
   wherein the first dyed reflective layer reflects light that is incident upon the first carbon fiber woven fabric layer at the one or more first voids to maintain a color performance target of the first carbon fiber woven fabric layer,
   wherein the second dyed reflective layer reflects light that is incident upon the second carbon fiber woven fabric layer at the one or more second voids to maintain a color performance target of the first carbon fiber woven fabric layer,
   wherein the first dyed reflective layer has a second FAW, wherein the second FAW and the first FAW are both less than 75 grams per square meter (GSM).

2. The composite carbon fiber laminate of claim 1, wherein the first and the second reflective layers are dyed glass fiber fabric.

3. The composite carbon fiber laminate of claim 1, wherein the first and the second reflective layers are dyed carbon fiber fabric.

4. The composite carbon fiber laminate of claim 1, further comprising a second additional fabric layer positioned between the second carbon fiber woven fabric layer and the second dyed reflective layer, the second additional fabric layer having the first FAW.

* * * * *